United States Patent [19]

Ishimura et al.

[11] Patent Number: 4,833,226
[45] Date of Patent: May 23, 1989

[54] HARDENER FOR CURABLE ONE-PACKAGE EPOXY RESIN SYSTEM

[75] Inventors: Hidekazu Ishimura, Fujinomiya; Masahiko Otsuka, Kurashiki; Yasushi Takahashi; Tadayoshi Ishikawa, both of Fuji, all of Japan

[73] Assignee: Asahi Kasei Kogyo Kabushiki Kaisha, Osaka, Japan

[21] Appl. No.: 89,368

[22] Filed: Aug. 26, 1987

[51] Int. Cl.$^4$ .................. C08G 59/44; C08G 59/54
[52] U.S. Cl. .................. 528/45; 252/183.11; 523/206; 523/211; 525/526; 525/936; 525/528; 528/367
[58] Field of Search .................. 525/526, 936, 528; 523/206, 211; 528/45, 367

[56] References Cited

U.S. PATENT DOCUMENTS

| | | | |
|---|---|---|---|
| 3,391,095 | 7/1968 | Tringali et al. | 523/211 |
| 3,395,105 | 7/1968 | Washburn et al. | 523/211 |
| 4,224,422 | 9/1980 | Rude et al. | 525/936 X |
| 4,335,228 | 6/1982 | Beitchman et al. | 528/117 X |
| 4,503,161 | 3/1985 | Korbel et al. | 528/93 X |
| 4,533,715 | 8/1985 | Lee et al. | 525/526 X |
| 4,536,524 | 8/1985 | Hart et al. | 523/176 |
| 4,540,750 | 9/1985 | Ham | 525/526 X |
| 4,749,729 | 6/1988 | Kohli et al. | 528/45 X |

FOREIGN PATENT DOCUMENTS 0039230 4/1981 European Pat. Off.
1193068 3/1986 European Pat. Off.
872797 7/1961 United Kingdom.
1103202 2/1968 United Kingdom.

OTHER PUBLICATIONS

Chemical Abstracts, vol. 83, No. 26, Dec. 29, 1975, p. 90, Abstract No. 207718z.

*Primary Examiner*—Earl Nielsen
*Attorney, Agent, or Firm*—Armstrong, Nikaido, Marmelstein & Kubovcik

[57] ABSTRACT

A master batch of hardener for curable one-package epoxy resin system which comprises (I) a hardener consisting of (I) a hardener consisting of
 (i) a powder of an amine compound (A) as a core having at least one tertiary amino group in the molecule while having no primary and secondary amino groups, the powder having both a group (X) capable of absorbing infrared rays of 1630 to 1680 cm$^{-1}$ in wave length and a group (Y) capable of absorbing infrared rays of 1680 to 1725 cm$^{-1}$ in wave length at least on the surface of the powder, and
 (ii) a reaction product of the amine compound (A) and an epoxy resin as a shell; and
(II) an epoxy resin (B) in a ratio of 10 to 50,000 parts by weight to 100 parts by weight of the hardener (I).

A hardener containing the master batch is also disclosed.

23 Claims, 3 Drawing Sheets

HARDENER FOR CURABLE ONE-PACKAGE EPOXY RESIN SYSTEM

BACKGROUND OF THE INVENTION

1. FIELD OF THE INVENTION

The present invention relates to a novel master batch of hardener for curable one-package epoxy resin systems. More particularly, the invention is directed to a latent master batch of hardener, mixtures of the hardener with epoxy resins being superior in storage stability, mixable with a great easiness, less affected by shear stress exerted thereupon during mixing, and producing hardened products of superior qualities, and a hardener composition thereof.

2. DESCRIPTION OF THE PRIOR ART

Epoxy resins are in extensive use for paints, electrical insulating materials, adhesives, etc., because hardened products of the resin have excellent performance characteristics. Curable epoxy resin systems generally used today are of the so-called two-package type composition, in which an epoxy resin and a hardener are mixed together just before use. Although curable at room temperature, the two package compositions type are bothersome to store and handle, since the epoxy resin and the hardener need to be stored separately and weighed and mixed before use as required. In addition, the limited pot life of the composition makes it impossible to mix both of the components in large amounts and hence the frequency of mixing them increases and the operation efficiency is inevitably lowered.

Some one-package type compositions have been proposed for the purpose of solving the problems associated with the two-package type ones. For example, there have been proposed compositions of epoxy resins with latent hardeners such as dicyandiamide, $BF_3$-amine complex, modified imidazole compounds (U.S. Pat. No. 4,066,625) and amine salts. Of these hardeners, dicyandiamide has long been known. When it is used alone to cure epoxy resins, curing temperatures of at least 170° C. are necessary. The compositions thereof, however, when stored at room temperature, have shelf lives (pot lives) of at least 6 months. To decrease the curing temperature to the order of 130° to 150° C., there has been proposed the use of an accelerator such as a teriary amine, imidazole compound, or dimethylurea. The accelerator, however, shortens the pot life and thus fails to make the most of the latency of dicyandiamide.

Other approaches to one-package epoxy resin-hardener systems include; mixing an epoxy resin with an amine type hardener, followed immediately by freezing the mixture to stop their reaction; microencapsulating an amine type hardener; and adsorbing a hardener on a molecular sieve. However, the frozen type, microcapsule type, and molecular sieve type, at present, are inferior in performance characteristics, particularly in properties of the hardened products, and hence are scarcely put to practical applications.

Japanese Patent Publication No. 17654/68 describes a one-package epoxy resin system using a microencapsulated hardener. However, these microcapsules must be mechanically broken in order to cure the epoxy resin. Accordingly, this type of system does not meet the present requirement for epoxy resins to be cured without applying pressure. Japanese Patent Application Laid-Open No. 83023/83 discloses an approach comprising blocking functional groups present at the particle surface of a hardener with methyl iodide, acetic acid or the like, but simple blocking of functional groups at the surface cannot provide characteristics necessary for a one-package type composition, particularly long-term storage stability thereof.

Japanese Patent Publication No. 55970/83 and Japanese Patent Application Laid-Open Nos. 27914/84 and 59720/84, and EP-A-0193068 disclose that good hardener for one-package epoxy resin compositions can be obtained by combining powdery amine compounds with iso-cyanate compounds. Japanese Patent Application Laid-Open No. 59720/84 describes that the one-package characteristics can be achieved conceivably by deactivation due to the isocyanate compound being present at the surface of the powdery amine compound. As stated above, however, properties necessary for the one-package type composition, particularly good storage stability, cannot be maintained by simple blocking of functional groups at the surface. For the practical use of a one-package type composition uniformity of the composition is important; that is, a powdery hardener should be dispersed uniformly in the epoxy resin by means of a roller mill or other equipment. However, the methods disclosed in these four patent applications have a drawback in that inert surface layers once formed are ruptured by shear stresses exerted during dispersion at room temperature and this worsens the storage stability of the objective composition.

As stated above, one-package type epoxy resin compositions according to the prior art have drawbacks, each failing to exhibit the advantage of storage stability.

SUMMARY OF THE INVENTION

It is an object of the inventon to provide a hardener for curable one-package epoxy resin systems which have long pot lives while maintaining the advantage of good storage stability and to provide hardener compositions.

The inventors made intensive studies in order to develop a hardener which overcomes the above noted drawbacks of the prior art one-package epoxy resin systems and which can receive the full benefit of one-package epoxy resin systems. As a result, the present invention has been accomplished.

Thus, the present invention provides a master batch of hardener for curable one-package epoxy resin systems which comprises (I) a hardener consisting of (i) a powder of an amine compound (A) as a core having at least one tertiary amino group in the molecule while having no primary and secondary amino groups, the powder having both a group (X) capable of absorbing infrared rays of 1630 to 1680 $cm^{-1}$ in wave length and a group (Y) capable of absorbing infrared rays of 1680 to 1725 $cm^{-1}$ in wave length at least on the surface of the powder, and (ii) a reaction product of the amine compound (A) and an epoxy resin as a shell; and (II) an epoxy resin (B) in a ratio of 10 to 50,000 parts by weight to 100 parts by weight of the hardener (I).

The master batches of hardener s of the present invention for one-package epoxy resin systems have the following advantages (1) to (5) over those of the prior art:

(1) The present hardener can be easily dispersed thoroughly to form homogeneous compositions with epoxy resins since it is provided as a master batch.

(2) Mixtures of the present master batches of hardeners with epoxy resins have long pot lives. At 0° C. the lives are expectively long, as is expected, and even at relatively high temperatures of 25° to 50° C. the lives are as long as two weeks to one year.

(3) The curing of said mixtures requires lower temperatures and shorter periods of time. The present master batch of hardeners exhibit sufficient properties when the curing is conducted even at relatively low temperatures of 80° to 130° C. for periods of 5 to 60 minutes. At high temperatures of 130° to 200° C., the curing proceeds quickly enough as to be completed in periods of dozens of seconds to several minutes.

(4) Without exerting any external mechanical force, said mixtures on being heated at a prescribed temperature or higher provide good cured products.

(5) The pot lives of said mixtures are little varied by exerting shear stress thereon. This advantage is explained more fully below.

In mixtures with epoxy resins, the hardener needs to be dispersed uniformly. If the dispersion is nonuniform, the hardened product will be uneven in quality, that is, the product quality will vary with the degree of curing, and a part of the hardener will remain unreacted depending on circumstances. This unreacted hardener may have an adverse effect on properties, such as water resistance, of the cured product. In order to avoid these difficulties, the hardener needs to be dispersed uniformly in the mixtures. When the hardener is in the form of a powder, particularly a fine powder, a secondary agglomeration of its particles is liable to occur in the mixtures. Hence, shear stress is generally exerted on the mixtures by means of a roll mill or the like to homogenize the mixtures. In the case of the surface-treated powdery hardeners according to the prior art, the inert surface layers are liable to be destroyed, as stated above, in such a mixing operation. As a consequence, the effect of the surface treatment in an extreme case is not observed at all.

DETAILED DESCRIPTION OF THE INVENTION

Hereinafter, the master batch of hardener of the invention for one-package epoxy resin systems is described in detail.

The master batch of hardener of the present invention is a product obtainable by mixing a hardener (I) with an epoxy resin (II) in a specified ratio mentioned hereinafter.

The term "hardener (I)" denotes, as used herein, a material composed of a core consisting of an amine compound (A) in the powder form and a shell consisting of a reaction product of the amine compound (A) with an epoxy resin.

The term "an amine compound (A) in the powder form" denotes, as used herein, a product obtainable by treating a tertiary-amino-containing amine compound (a) in a manner as specified hereinafter.

Said tertiary-amino-containing amine compound (a) that can be used in the invention include:

(1) products (a-1) which are the reaction product of compounds having at least one primary amino group in the molecule and/or compounds having at least one secondary amino group in the molecule with carboxylic acids, sulfonic acids, isocyanates, or epoxy compounds (the products (a-1) are exclusive of ones having a primary or secondary amino group) and (2) imidazole compounds (a-2).

Raw materials of reaction products (a-1) are described below in more detail.

Compounds having at least one primary amino group in the molecule, useful herein, may be any of aliphatic, alicyclic, and aromatic primary amines. The following compounds are cited as examples of the raw material primary amines.

Aliphatic primary amines: methylamine, ethylamine, propylamine, butylamine, ethylenediamine, propylenediamine, hexamethylenediamine, diethylenetriamine, triethylenetetramine, methanolamine, ethanolamine, and propanolamine.

Alicyclic primary amines: cyclohexylamine, isophoronediamine, aminoethylpiperazine, and diethylamino propylamine.

Aromatic primary amines: aniline, toluidine, diaminodiphenylmethane, and diaminodiphenyl sulfone.

Compounds having at least one secondary amino group in the molecule, useful herein, may be any of aliphatic, alicyclic, and aromatic secondary amines, imidazole compounds, and imidazoline compounds. The following compounds are cited as examples of the raw material secondary amine compounds.

Aliphatic secondary amines: dimethylamine, diethylamine, dipropylamine, dibutylamine, dipentylamine, dihexylamine, dimethanolamine, diethanolamine, and dipropanolamine.

Alicyclic secondary amine: dicyclohexylamine and N-methylpiperazine.

Aromatic secondary amines: diphenylamine, phenylmethylamine, and phenylethylamine.

Imidazole compounds: imidazole, 2-methylimidazole, 2-ethylimidazole, 2-isopropylimidazole, 2-dodecylimidazole, 2-undecylimidazole, 2-phenylimidazole, 2-heptadecylimidazole, 2-ethyl-4-methylimidazole and carboxylic acid salts of these imidazole compounds.

Imidazoline compounds: 2-methylimidazoline, 2-phenylimidazoline, 2-undecylimidazoline, and 2-heptadecylimidazoline.

Examples of other raw materials of the reaction products (a-1) are described below.

Carboxylic acids: succinic acid, adipic acid, sebacic acid, phthalic acid, and dimer acid.

Sulfonic acids: ethanesulfonic acid and p-toluenesulfonic acid.

Isocyanates: tolylenediisocyanate, 4,4'-diphenylmethanediisocyanate, and hexamethylenediisocyanate.

Epoxy compounds: Any of monoepoxy, diepoxy, and multi-valent epoxy compounds may be used.

Monoepoxy compounds: butyl glycidyl ether, hexyl glycidyl ether, phenyl glycidyl ether, allyl glycidyl ether, p-t-butylphenyl glycidyl ether, ethylene oxide, propylene oxide, p-xylyl glycidyl ether, glycidyl acetate, glycidyl butyrate, glycidyl hexoate, glycidyl benzoate, and epoxy resins.

Diepoxy compounds: diglycidyl compounds obtained from dihydric phenols such as bisphenol A, bisphenol F, catechol, and resorcinol; dihydric alcohols such as ethylene glycol, propylene glycol, polyethylene glycol, polypropylene glycol, 1,4-butanediol, and neopentyl glycol; hydroxycarboxylic acids such as p-hydroxybenzoic acid and $\beta$-hydroxynaphthoic acid, and dicarboxylic acids such as phthalic acid, terephthalic acid, and hexahydrophthalic acid through reactions thereof with epichlorohydrin; and alicyclic epoxy compounds such as 3,4-epoxy-6-methylcyclohexylmethyl-3,4-epoxy-6-methylcyclohexanecarboxylate and 3,4-epoxycyclohexylmethyl(3,4-epoxycyclohexane)carboxylate.

A preferable amine compound (a-1) is a reaction product of an alicyclic secondary amine with a monoepoxy compound; which is obtained by reacting 1 equivalent of an active hydrogen atom of the secondary amine with 1 equivalent of an epoxy group of the epoxy compound. A further preferred one is the one when the alicyclic secondary amine is N-methylpiperazine.

Suitable imidazole compounds (a-2) include, 1-cyanoethyl-2-undecylimidazole trimellitate, imidazolylsuccinic acid, 2-methylimidazolesuccinic acid, 2-ethylimidazolesuccinic acid, 1-cyanoethyl-2-methylimidazole, 1-cyanoethyl-2-undecylimidazole, and 1-cyanoethyl-2-phenylimidazole.

As a preferable amine compound (a), there is a product obtained by reacting a primary or secondary amine with an epoxy-containing compound at the ratio of 1 equivalence of active hydrogen atom of the amine compound to 0.8 to 1.2 equivalence of epoxy groups of the epoxy compound.

Of these amine compounds, imidazole derivatives having at least one hydroxyl group in the molecule are preferable for the purpose of obtaining one-package epoxy resin compositions which are easy to cure and excellent in storage stability.

Further preferred amine compounds for use in the invention are those having at least two hydroxyl groups in the molecule which are produced by the reaction of imidazole compounds with a compound having at least two epoxy groups in the molecule. Such imidazole derivatives include, for example, adducts of imidazole compounds or carboxylic acid salts of imidazole compounds to compounds having at least one epoxy group in the molecule.

Suitable imidazole compounds for the preparation of said derivatives are, for example, imidazole, 2-methylimidazole, 2-ethylimidazole, 2-ethyl-4-methylimidazole, 2-isopropylimidazole, 2-undecylimidazole, 2-phenylimidazole, and carboxylic acid salts of these imidazole compounds; suitable carboxylic acids for these salts are, for example, acetic acid, lactic acid, salicylic acid, benzoic acid, adipic acid, phthalic acid, citric acid, tartaric acid, maleic acid, and trimellitic acid.

Suitable compounds having at least one epoxy group in the molecule for the preparation of said derivatives include monoepoxy compounds, e.g., butyl glycidyl ether, hexyl glycidyl ether, phenyl glycidyl ether, p-xylyl glycidyl ether, glycidyl acetate, glycidyl butyrate, glycidyl hexoate, glycidyl benzoate, allyl glycidyl ether, p-t-butylphenyl glycidyl ether, ethylene oxide, propylene oxide, and epoxy resins.

For the purpose of achieving superior curability and storage stability of the resulting compositions, preferred imidazole compounds are 2-methylimidazole, 2-ethyl-4-methylimidazole and mixtures thereof and the most desirable epoxy compound is an epoxy resin produced by reaction of bisphenol A with epichlorohydrin.

The synthesis of the imidazole compound-epoxy compound adduct can be carried out by reacting 1 to 5 moles of an imidazole with 1 to 5 moles of an epoxy compound according to the general method hitherto known.

There is no particular restriction on the average particle size of the amine compound (A) powder used in the invention, but an average particle size that is too large may deteriorate the curability of the composition or impair mechanical properties of the hardened product. Desirably, the average particle size should not exceed 50$\mu$, if it is larger than 50$\mu$, properties of the hardened product, such as chemical resistance and mechanical strength, will be impaired. Most suitably, the average particle size does not exceed 10$\mu$.

The term "particle size" used herein means a Stokes' diameter measured by the centrifugal sedimentation method or the usual sedimentation method shown in Table 4.4 or "Gyoshu Kogaku" ("Agglomeration Engineering") edited by Japanese Powder Industrial Technical Association (issued 1982). The term "average particle size" denotes a mode diometer.

The reason for excluding compounds having primary or secondary amino groups from compounds (a) suitable for use in the invention is that, when a compound having these groups is incorporated into an epoxy resin, particularly a liquid epoxy resin, the resulting composition has an extremely high viscosity because a considerable amount of such a compound is needed.

The respective groups capable of absorbing infrared rays of 1630 to 1680 $cm^{-1}$ and those of 1680 to 1725 $cm^{-1}$ in the amine compound (A) in the powder form can be determined by using an infrared spectrophotometer and an be analyzed in more detail by using a Fourier transformation type of infrared spectrophotometer.

Among the groups (X) having absorption at wave length of 1630 to 1680 $cm^{-1}$, a urea linkage, for example, is particularly useful.

Among the groups (Y) having absorption at wave length of 1680 to 1725 $cm^{-1}$, a biuret linkage, for example, is particularly useful.

The urea linkage and biuret linkage are formed by reaction of an isocyanate compound with water or with an amine compound having at least one primary amino group in the molecule.

For the formation of a urea linkage, which is representative of groups (X), and a biuret linkage, which is representative of groups (Y), any isocyanate compound may be used that has at least one isocyanate group in the molecule, but it is preferable to use an isocyanate compound having at least two isocyanate groups in the molecule. Typical isocyanate compounds suitable for this purpose are aliphatic diisocyanates, alicyclic diisocyanates, aromatic diisocyanates, and aliphatic triisocyanates.

As examples of such polyisocyanates there are the following compounds.

Aliphatic diisocyanates: ethylenediisocyanate, propylenediisocyanate, butylenediisocyanate, and hexamethylenediisocyanate.

Alicyclic diisocyanates: isophoronediisocyanate and 4,4'-dicyclohexylmethanediisocyanate.

Aromatic diisocyanates: tolylenediisocyanate, 4,4'-diphenylmethanediisocyanate, xylylenediisocyanate, and polymethylene polyphenyl polyisocyanate.

Aliphatic triisocyanate: 1,3,6-triisocyanate methylhexane.

For the formation of urea and biruet linkages, it is also possible to use an adduct of the above-mentioned isocyanate compound to a compound having a hydroxyl group in the molecule. Such adducts include, for example, products of the reaction of isocyanate compounds with dihydroxyalkanes and products of the reaction of isocyanate compounds with bisphenols. Products of the preliminary reaction of isocyanate compounds with water can also be used.

Aliphatic, alicyclic, and aromatic amines can be used as amine compounds having at least one primary amino group in the molecule for the formation of a urea linkage and a biuret linkage.

As examples of such amines there are the following compounds.

Aliphatic amines: alkylamines including methylamine, ethylamine, propylamine, and butylamine; alkylenediames including ethylenediamine, propylenediamine, butylenediamine, and hexamethylenediamine; and polyalkylenepolyamines including diethylenetriamine, triethylenetetramine, and tetraethylenepentamine.

Alicyclic amines: cyclopropylamine, cyclobutylamine, cyclopentylamine, cyclohexylamine, and isophoronediamine.

Aromatic amines: aniline, toluidine, benzylamine, naphthylamine, diaminodiphenylmethane, and diaminodiphenyl sulfone.

It is desirable that an amino compound (A) in the powder form contains group (X) and group (Y) in concentrations of 1 to 1000 meg/kg and 1 to 1000 meg/kg, respectively.

When the concentration of group (X) is lower than 1 meg/kg, the mechanical strength thereof is insufficient and therefore the pot life of the composition is short. When the concentration is higher than 1000 meg/kg, the curing ability of the hardener is low and elevated-temperature curing is necessary; hence such high temperatures are impractical. Preferred concentrations of group (X) are in the range of 10 to 300 meg/kg.

When the concentration of group (Y) is lower than 1 meg/kg, the mechanical strength thereof is also insufficient and therefore the pot life of the composition is short. When the concentration is higher than 1000 meg/kg, the curing ability of the hardener is also low and elevated-temperature curing becomes necessary; hence such high temperatures are impractical. Preferred concentrations of group (Y) are in the range of 10 to 200 meg/kg.

Preferably, said amine compound (A) in the invention also contains a group (Z) capable of absorbing infrared rays of 1730 to 1755 cm$^{-1}$ in wave length.

Particularly useful groups (Z) include carbonyl-containing groups such as a urethane linkage. The urethane linkage can be formed by the reaction of an isocyanate compound with a compound having at least one hydroxyl group in the molecule.

Suitable compounds having at least one hydroxyl group in the molecule useful for forming a urethane linkage, which is a representative of groups (Z), include; alcohols such as saturated aliphatic alcohols, unsaturated aliphatic alcohols, alicyclic alcohols, and aromatic alcohols; and phenols.

As examples of such alcohols there are the following compounds.

Saturated aliphatic alcohols: monoalcohols, e.g., methyl, ethyl, propyl, butyl, amyl, hexyl, heptyl, octyl, nonyl, decyl, undecyl, lauryl, dodecyl, stearyl, and eicosyl alcohols; ethylene glycol monoalkyl ethers, e.g., ethylene glycol monomethyl ether, ethylene glycol monoethyl ether, ethylene glycol monobutyl ether, and ethylene glycol monohexyl ether; dihydric alcohols, e.g., ethylene glycol, polyethylene glycol, propylene glycol, polypropylene glycol, 1,3-butanediol, and neopentyl glycol; trihydric alcohols, e.g., glycerol and trimethylolpropane; and tetrahydric alcohols, e.g., pentaerythritol.

Unsaturated aliphatic alcohols: allyl alcohol, crotyl alcohol, and propargyl alcohol.

Alicyclic alcohols: cyclopentanol and cyclohexanol.

Aromatic alcohols: monoalcohols, e.g., benzyl alcohol and cinnamyl alcohol.

These alcohols may be primary, secondary, or tertiary. Other alcohols which can be used to form group (Z) are compounds having at least one secondary hydroxyl group which are produced by the reaction of compounds having at least one epoxy group in the molecule with a compound having at least one hydroxyl, carboxyl, primary amino, secondary amino, or mercapto group in the molecule.

Suitable phenols for use in forming group (Z) include: monohydric phenols, e.g., phenol, cresol, xylenol, carvacrol, thymol, and naphthol; dihydric phenols, e.g., catechol, resorcinol, hydroquinone, bisphenol A, and bisphenol F; and trihydric phenols, e.g., pyrogallol and phloroglucin.

Preferred compounds having at least one hydroxyl group in the molecule are alcohol compounds or phenol compounds which have two or more hydroxyl groups in the molecule.

Preferred concentrations of group (Z) in the amino compounds (A) are in the range of 1 to 200 meg/kg.

When the concentration of group (Z) in compound (A) is lower than 1 meg/kg, the pot life of the composition is short. When this concentration is higher than 200 meg/kg, the curing ability is inferior and an elevated curing temperature becomes necessary; hence such high concentrations of group (Z) are impractical. Particularly preferred concentrations are in the range of 5 to 100 meg/kg.

The ratio of the concentration of group (Z) to the total concentration of group (X) and group (Y):

$$\frac{\text{group }(Z)}{\text{group }(X) + \text{group }(Y)}$$

is desired to be in the range of 0.05 to 1.0. When the concentration ratio is less than 0.05, the cohesive force will be too strong and a higher curing temperature than practical becomes necesary. When the concentration ratio is larger than 1.0, the cohesive force will be weak and the composition will be deficient in storage stability and will have lower resistance to shear stress.

Figure 1:
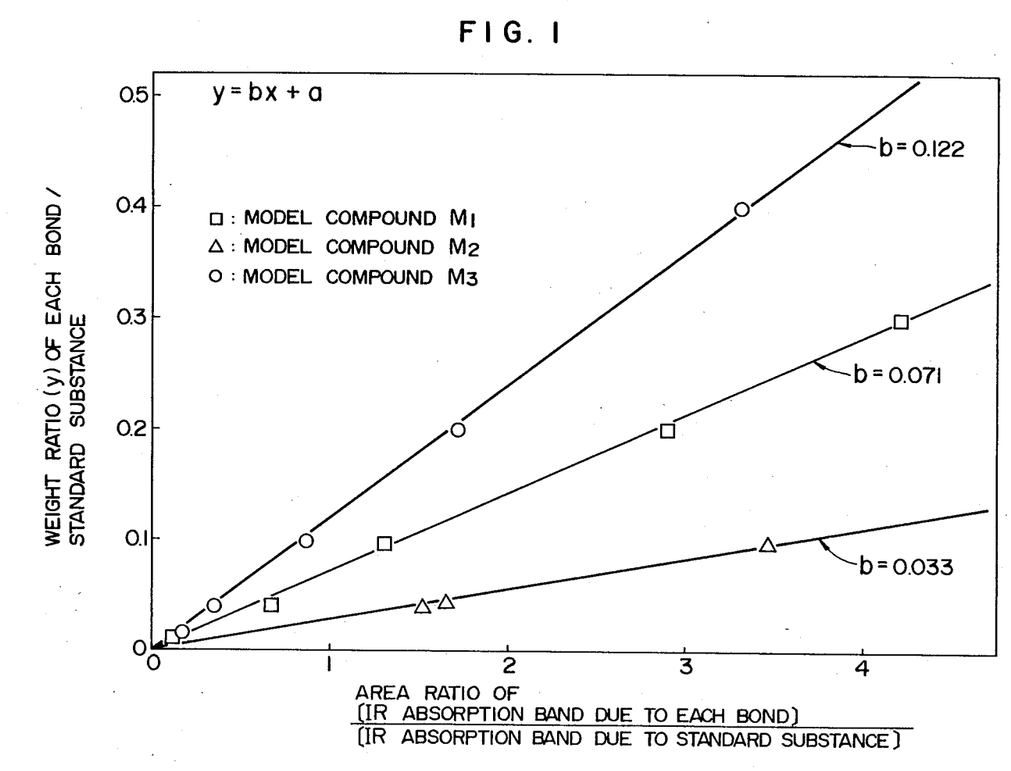
FIG. 1 shows calibration curves which indicate the relation between (1) the weight ratio of each of model compounds (M1), (M2), and (M3) to a standard substance used in Reference Example 5 and (2) the area ratio of each of an absorption band ranging from 1630 to 1680 $cm^{-1}$ in the IR spectrum of model compound (M1), an absorption band ranging from 1680 to 1725 $cm^{-1}$ in the IR spectrum of model compound (M2), and an absorption band ranging from 1730 to 1755 $cm^{-1}$ in the IR spectrum of model compound (M3) to an absorption band ranging from 2220 to 2250 $cm^{-1}$ in the IR spectrum of the standard substance.

Concentrations of group (X) and group (Y) in the amino compound (A) can be determined as follows: Calibration curves as shown in FIG. 1 are drawn by using model compounds represented severally by the formulae (1) and (2):

(Model compound M1)

(Model compound M2)

that have group (X) and group (Y), respectively, and a standard substance having neither group (X) nor group (Y) and being capable of absorbing infrared rays of cyano group. Then, the standard substance and the amino compound (A) are mixed together in a definite ratio, and the infrared absorbence of the mixture is measured at wave length of from 1630 to 1680 cm$^{-1}$ and from 1680 to 1725 cm$^{-1}$. Thereafter, the concentration of each group is determined from the found absorbance and each calibration curve. An example of the standard substance is 2,3-dimethyl-2,3-dicyanobutane. It is possible to utilize the absorbance at wave numbers of 2220 to 2250 cm$^{-1}$ due to the cyano groups of this compound, since it does not disturb the absorbance at the above-mentioned wave length of the present hardener, and gives a stable absorbance which is useful as a standard compound.

The concentration of group (Z) can be determined similarly to the determinations of group (X) and group (Y) by using a model compound represented by the following formula (3) and 2,3-dimethyl-2,3-dicyanobutane.

(Model compound M3)

There is no particular restriction on the choice of epoxy resins (B) for the present invention so far as they have on the average at least two epoxy groups in the molecule. Examples of such epoxy resins are: polyglycidyl ether obtained by reacting epichlorohydrin with a polyhydric phenol such as bisphenol A, bisphenol F. catechol, or resorcinol or with a polyhydric alcohol such as glycerol or polyethylene glycol; glycidyl ether esters obtained by reacting epichlorophydrin with a hydroxycarboxylic acid such as p-hydroxybenzoic acid or β-hydroxynaphthoic acid; polyglycidyl esters obtained by reacting epichlorohydrin with a carboxylic acid such as phthalic acid or terephthalic acid; glycidylamine compounds obtained by reacting epichlorophydrin with 4,4'-diaminodiphenylmethane or with m-aminophenol; and epoxidized novolak resins, epoxidized cresol novolak resins, and epoxidized polyolefins, though not limited to these resins. In particular, diglycidyl ether obtained from bisphenol A is preferred.

The thickness of the shell covering the core which comprises the amino compound (A) in the powder form is predetermined depending on the desired pot life of the intended compositions of the hardener with epoxy resins. Generally, the average thickness of the shell is desirably from 50 to 10,000Å. With an average thickness of the shell of less than 50Å, the pot life is insufficient. An average thickness exceeding 10,000Å is impractical since too high a temperature is necessary for curing in such a case. The thickness of the shell can be measured by observing sliced particles of the hardener through a transmission type of electron microscope. A particularly preferred thickness of the shell is from 100 to 1000Å on the average.

As a process for preparing the master batch of hardeners of the present invention is illustratively given the following method:

A powdered tertiary-amino-containing amino compound (a) is firstly dispersed in an epoxy resin, then thereto is added an isocyanate compound. Thereafter, said two compounds are subjected to react in the presence of water, thereby the shell can be formed on the surface of the core.

The concentrations of the groups (X), (Y) and (Z) in the amino compound (A) in the powder form; said amino compound (A) acts as a core, can be adjusted by varying:

(i) amount of water to that of the powdered tertiary-amino-containing amino compound (a), and/or (ii) amount and kind of the isocyanate compound to those of the tertiary-amino-containing amino compound (a).

It is preferred to mix the powered compound (a) with the expoy resin (B) by giving shear stress by means of three-roll or the like for predispersion of the compound (a) in the resin (B).

The epoxy resin (B) which is one of the essential component for the master batch of hardener according to the present invention acts as a vehicle for reacting the compound (a) with isocyanate compounds in the presence of water. Furthermore, the epoxy resin (B) has a positive role for improving the storage stability of the hardener by forming the shell which is formed as a result of reaction between a part of the resin (B) and the amine compound (A) in the powder form.

The mixing ratio by weight of the amine compound (A) in the powdered form and the epoxy resin (B) used in the present invention is in the range of 1/0.1 to 1/500. If the ratio exceeds 1/0.1, the amine compound fails to disperse thoroughly in the epoxy resin (B). If the ratio is below 1/500, the master batch of hardener fails to exert its latent ability as hardener. A preferred range is 1/1 to 1/5.

The master batch of hardeners of the present invention is a liquid or paste at room temperature.

Any special apparatus is not needed for obtaining the composition in which the master batch of hardener of the present invention disperses thoroughly in the epoxy resin (B). The present composition can be easily prepared by mixing merely said compound (a) and said resin (B). Such mixing can be attained by using a three-roll mill with giving a shear stress thereto.

Any epoxy resin can be used as a resin to be hardened by the master batch of hardener of the present invention so far as it has on the average at least two epoxy groups in the molecule. Examples of such epoxy resins are: polyglycidyl ether obtained by reacting epichlorohydrin with a polyhydric phenol such as bisphenol A, bisphenol F, catechol, or resorcinol or with a polyhydric alcohol such as glycerol or polyethylene glycol; glycidyl ether esters obtained by reacting epichlorohydrin with a hydroxycarboxylic acid such as p-hydroxybenzoic acid or $\beta$-hydroxynaphthoic acid; polyglycidyl esters obtained by reacting epichlorohydrin with a carboxylic acid such as phthalic acid or terephthalic acid; glycidylamine compounds obtained by reacting epichlorohydrin with 4,4'-diaminodiphenylmethane or with m-aminophenol; and epoxidized novolak resins, epoxidized cresol novolak resins, and epoxidized polyolefins, though not limited to these resins. In particular, diglycidyl ether obtained from bisphenol A is preferred.

The mixing ratio of the master batch of hardener of the invention to the epoxy resin is chosen in view of the desired curing properties of the formulated resin and the desired properties of the hardened product. Generally it is desirable to mix 0.1 to 100 parts by weight of the master batch of hardener with 100 parts by weight of the epoxy resin. When the proportion of the master batch of hardener is less than 0.1 part by weight, a long time is required to obtain a sufficiently hardened product, and hence such a proportion is impractical. When the proportion exceeds 100 parts by weight, the composition has a high viscosity and much heat is generated in the curing step, making the control of curing difficult.

The one-package epoxy resin system containing the master batch of hardener of the invention may be supplied in the form of a composition which additionally contains a hardener other than the hardener of the present invention. Suitable other hardeners include, for example, guanidines such as dicyandiamide, methylguanidine, ethylguanidine, propylguanidine, butylguanidine, dimethylguanidine, trimethylguanidine, phenylguanidine, diphenylguanidine, and toluylguanidine; acid hydrazides such as succinic acid hydrazide, adipic acid hydrazide, glutaric acid hydrazide, sebacic acid hydrazide, phthalic acid hydrazide, isophthalic acid hydrazide, terephthalic acid hydrazide, p-hydroxybenzoic acid hydrazide, salicylic acid hydrazide, phenylaminopropionic acid hydrazide, and maleic acid hydrazide; aromatic amines such as diamino diphenylmethane, diaminodiphenyl sulfone, m-phenylenediamine, p-phenylenediamine, diaminotoluene, diaminoxylene, diaminodiphenylamine, diaminobiphenyl, bis(3-chloro-4-aminophenyl)methane, and diaminobenzoic acid; and acid anhydrides such as phthalic anhydride, trimellitic anhydride, pyromellitic anhydride, tetrahydrophthalic anhydride, hexahydrophthalic anhydride, 3-chlorophthalic anhydride, 4-chlorophthalic anhydride, benzophenonetetracarboxylic anhydride, succinic anhydride, methylsuccinic anhydride, dimethylsuccinic anhydride, dichlorosuccinic anhydride, methylnadic anhydride, dodecylsuccinic anhydride, chlorendic anhydride, and maleic anhydride. Of these hardeners, preferred are guanidine compounds and acid anhydrides.

A particularly preferred guanidine compound is dicyandiamide. The bonding strength can be enhanced by adding dicyandiamide. The compatibility of curability with storage stability can be attained with ease by using dicyandiamide in the proportion range:

$$0.02 \leq \text{Dicyandiamide/Hardener(I)} \leq 50.$$

Of the acid anhydrides, preferred are compounds such as hexahydrophthalic anhydride, methylhexahydrophthalic anhydride, methyltetrahydrophthalic anhydride, and methylnadic anhydride, These hardeners when used each in the proportion range:

$$1 \leq \text{Acid anhydride/Hardener(I)} \leq 1,000$$

provide compositions superior in curability and storage stability and hardened products superior in heat stability and water resistance.

In the preparation of the one-package epoxy resin systems containing the master batch of hardener of the invention, it is possible, if desired, to add 0–500 parts by weight each of extenders, reinforcements, fillers, pigments, organic solvents, reactive diluents, inert diluents, modified epoxy resins, etc.

Examples of suitable fillers include coal tar, glass fiber, asbestos fiber, boron fiber, carbon fiber, cellulose, polyethylene powder, polypropylene powder, quartz powder, mineral silicate, mica, asbestos powder, slate powder, kaolin, aluminum oxide trihydrate, aluminum hydroxide, chalk powder, gypsum, calcium carbonate, antimony trioxide, Penton, silica, aerosol, lithopone, baryta, titanium dioxide, carbon black, graphite, iron oxide, gold, aluminum powder, and iron powder. The choise and amount of these fillers is determined according to the intended end use.

Examples of the organic solvent are toluene, xylene, methyl ethyl ketone, methyl isobutyl ketone, ethyl acetate, and butyl acetate.

Examples of the reactive diluent are butyl glycidyl ether, N,N-diglycidyl-o-toluidine, phenyl glycidyl ether, styrene oxide, ethylene glycol diglycidyl ether, propylene glycol diglycidyl ether, and 1,6-hexanediol diglycidyl ether.

Examples of the inert diluent are dioctyl phthalate, dibutyl phthalate, dioctyl adipate, and petroleum hydrocarbon solvents.

Examples of the modified epoxy resin are urethane-modified epoxy resin, rubber-modified epoxy resin, and alkyd-modified epoxy resin.

As will be seen from the following examples and comparative examples, the master batch of hardener of the present invention and the compositions containing the same, which provide hardened products having excellent properties, can be used over a wide variety of application fields. With respect to adhesives, the present hardeners and compositions are useful, for example, in the automotive field, for bonding headlight devices, gasoline tanks, or hem flanges of hoods, and for joining together steel sheets of bodies and of roofs; in the electrical application field, for bonding speaker magnets, for impregnating and bonding motor coils, and for bonding magnetic tape heads, batteries, or fluorescent lamp stabilizers; and in the electronic application field for die bonding, IC chip sealing, chip mounting, bonding of printed circuit boards, or film bonding. With respect to coating materials, the present hardeners and compositions are useful for powder coating materials and in special application fields, for solder resist inks and electroconductive coating materials. Moreover, the hardeners are applicable to electrical insulators and laminate structures.

Reference Example 1

A solid substance was obtained by reacting 1 mole of a bisphenol A type epoxy resin (supplied by Asahi Chemical Industry Co., Ltd. under the tradename of AER-330, epoxy equivalent weight 185) with 1.5 moles of 2-methylimidazole in a methanol-toluene mixture at 80° C., followed by distilling off the solvent under reduced pressure. The solid substance was ground, giving a powder of an amine compound (X-1) of 5μ in average particle size.

Reference Example 2

A solid substance was obtained by reacting 1 mole of a bisphenol A type epoxy resin (supplied by Asahi Chemical Industry Co., Ltd. under the tradename of AER-661, epoxy equivalent weight 470) with 2 moles of dimethylamine. This solid substance was ground giving a powder of an amine compound (X-2) of 8μ in average particle size.

Reference Example 3

A solid substance was obtained by reacting 4 moles of phenyl glycidyl ether with 1 mole of diaminodiphenylmethane, and was ground to give a powder of an amine compound (X-3) of 5μ in average particle size.

Reference Example 4

A polymer P was obtained by reacting 1 mole of diphenylmethanediisocyanate with 0.5 mole of hexamethylenediamine at 60° C. for 2 hours and then with 0.75 mole of bisphenol A at the same temperature for 2 hours. The IR spectrum of this polymer P showed absorption bands ranging from 1630 to 1680 cm$^{-1}$ and from 1680 to 1725 cm$^{-1}$.

Reference Example 5

(Preparation of calibration curves)

Using 2,3-dimethyl-2,3-dicyanobutane as a standard substance and a model compound

(M1)

a calibration curve was prepared which indicates the relation between the weight ratio of the model compound (M1) to the standard substance and the area ratio of an absorption band ranging from 1630 to 1680 cm$^{-1}$ in the IR spectrum of the model compound (M1) to an absorption band ranging from 2220 to 2250 cm$^{-1}$ in the IR spectrum of the standard substance. The calibration curve is shown in FIG. 1.

In the same way, calibration curves were prepared which indicate the relation between the weight ratio of each of a model compound (M2):

and a model compound (M3):

to the standard substance and the area ratio of each of an absorption band ranging from 1680 to 1725 cm$^{-1}$ in the IR spectrum of the model compound (M2) and an absorption band ranging from 1730 to 1755 cm$^{-1}$ in the IR spectrum of the model compound (M3) to the absorption band ranging 2220 to 2250 cm$^{-1}$ in the IR spectrum of the standard substance. These calibration curves are also shown in FIG. 1.

An FT-IR (model JIR-100, supplied by Nippon Densi Co., LTD.) was used for the measurement of IR spectra mentioned above.

Example 1

1 Gram of the polymer P was dissolved in 99 g of a 1:1 xylene-methanol solvent mixture. To this solution was added 50 g of 1-cyanoethyl-2-phenylimidazole (2PZ-CN) pulverized previously to an average particle size of 5μ. The mixture was stirred at 25° C. for 5 minutes and then quickly filtered to separate a cake. The separated cake was heated at 50° C. under reduced pressures of 5 to 10 mm Hg to vaporize the mixed solvents. In this case, the content of nonvolatile matter (polymer P) in the filtrate was found to be 0.3 wt%. Hence, the remainder of polymer P in an amount of 0.7 wt% based on the initial solution had adhered to the 2PZ-CN.

A mixture of 10 g of the obtained powdered material with 20 g of a bisphenol A type epoxy resin (supplied by Asahi Chemical Industry Co., Ltd. under the tradename of AER-331, epoxy equivalent weight 189) was prepared and dispersed over a three-roll (5 inches of the diameter) mill at an output rate of 120 g/min, thus making up 30 g of the master batch of hardener as a composition (H-1).

The viscosity of the master batch of hardener (H-1) thus obtained was 220,000 cps (at 25° C.). After one-week standing under the atmosphere of 40° C., the viscosity was 250,000. Hence, there was practically no change in the viscosity.

30 Grams of the master batch of hardener was mixed further with 120 g of AER-331 using a three-roll mill at the output rate of 120 g/min. to obtain a composition (F-1).

This composition (F-1) was allowed to stand at 50° C. to examine the change of the viscosity with time. The initial viscosity was 190 poises measured at 25° C. After one-week standing at 50° C., the viscosity was found to be 250 poises measured at 25° C. Hence, the viscosity increased by a factor of 1.32.

Gelation time of the composition (F-1) at 120° C. was measured by putting a sample of the composition on a hot plate according to the stroke curing method. The gelation time was determined to be 210 seconds.

Comparative Example 1

A composition (F-2) was prepared by adding 140 g of AER-331 to 10 g of 2PZ-CN pulverized to an average particle size of 5μ. The initial viscosity of the composition was 250 poises at 25° C. After one-week standing at 50° C., the composition gelled.

Example 2

(Preparation of hardener)

In a one l of separable flask equipped with a stirrer and a thermometer, 400 g of AER331, 200 g of the powdered amine compound (X-1) and 5 g of water were added and mixed thoroughly. Thereafter, 18 g of tolylenediisocyanate (TDI) was added. The resulting solution was heated to 40° C. for 2 hours. Then, the concentration of the unreacted TDI was determined and found to be less than 0.1 g, and thus the master batch of hardener (H-2) was obtained.

(Analysis of master batch of hardener)

15 Gram of the master batch of hardener (H-2) was mixed with 100 g of xylene. The mixture was left standing for 24 hours to precipitate insolubles in xylene. After filtration, this precipitation gave 5.6 g of a substance. The filtrate was subjected to dryness under a reduced pressure to distil off xylene, and a viscous liquid was obtained. The viscous liquid was identified as AER-331 by IR analysis and the determination of the epoxy equivalence by the KI-HCl method.

The precipitate thus separated was dried under a reduced pressure at 40° C., giving a sample for analysis.

To 3.3 mg of this sample was added 10 mg of 2,3-dimethyl-2,3-dicyanobutane. The mixture was ground in a mortar and then 2 mg of the ground mixture was further mixed and ground together with 50 mg of KB. Tablets of 8 mm in diameter were formed from this mixture by using a tableting machine.

IR spectra through these tablets were obtained by using the above-mentioned FT-IR (model JIR-100, supplied by Nippon Denshi Co., Ltd.). From the spectrum in the IR wave length region of 1500 to 1800 $cm^{-1}$, the concentration of groups (X) was determined using the calibration curve prepared previously. The found concentration was 55 meg/kg of the amine compound (A) in the powder form.

In much the same manner, the concentrations of groups (Y) and (Z) were determined from the areas of absorption bands ranging from 1680 to 1725 $cm^{-1}$ and from 1730 to 1755 $cm^{-1}$, respectively. The found concentrations of groups (Y) and (Z) were 25 meg/kg and 15 meg/kg, respectively.

Figure 2:
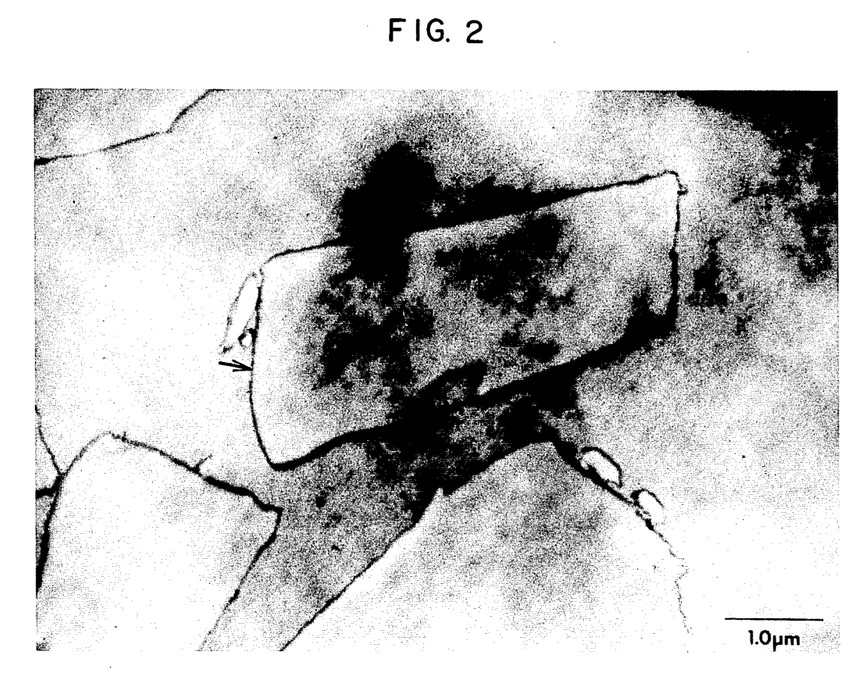
FIG. 2 is a photograph taken using a transmission type of electron microscope to show the cross-sectional structure of a particle of the hardener (H-1) prepared in Example 2, in which the shell, i.e., a reaction product of a powdery amine compound (A) with an epoxy resin (B) is indicated by the arrowhead mark.

A composition was prepared by mixing 30 g of the present master batch of hardener H-2, 100 g of AER-331 and 40 g of Epomate B-200 (a hardener supplied by Yukashell Co., LTD.) and the composition was cured at 25° C., under which no hardening occurred since said temperature was below the melting point of (H-2), to prepare specimens for electron microscope observation. The specimen particles were sliced, and the resulting cross sections were photographed by using a transmisstion type electron microscope. One of the photographs taken is shown in FIG. 2. It can be seen therefrom that a shell has been formed (shown by the arrowhead mark).

(Preparation of composition)

A mixture of 30 g of the master batch of hardener (H-2) and 100 g of a bisphenol A type epoxy resin (AER-331, epoxy equivalent weight 189, the same as used in Example 1) was roughly milled, and then was thoroughly mixed by using a three-roll (5 inches of the diameter) mill at an output rate of 110 g/min to prepare a composition (F-2).

(Measurement of properties of composition (F-2))

(1) Samples of the composition were allowed to stand at 25° C. and 50° C. to examine the change of viscosity with time. The initial viscosity of the composition was 180 poises at 25° C. After one-year standing at 25° C., the viscosity was 190 poises, showing little change. The viscosity after one-week standing at 50° C. was 220 poises at 25° C. No change in the viscosity was observed that will give rise to any problem in practical use.

(2) Gelation time of the composition was examined at 100° C. and 120° C. according to the stroke curing method. The gelation times at these temperatures were 540 seconds and 120 seconds, respectively.

(3) Using samples of the composition, iron-iron adhesion was carried out, where the applied composition was cured at 100° C. for 30 minutes. The tensile lap-shear strength of bonded specimens was found to be 130 $kg/cm^2$ at room temperature.

Comparative Example 2

A mixture of 8 g of the powdered amine compound (X-1) and 100 g of AER-331 was roughly milled, and the hardener was thoroughly dispersed in the epoxy resin by using a three-roll mill at an output rate of 110 g/min to prepare a composition (K).

Samples of the composition (K) were allowed to stand at 25° C. and 50° C. to examine the change of viscosity with time. The initial viscosity of this composition was 180 poises at 25° C. After one-week standing at 25° C., the viscosity was determined to be 15,000 poises or more, and in the case of standing at 50° C., the composition gelled.

Figure 3:
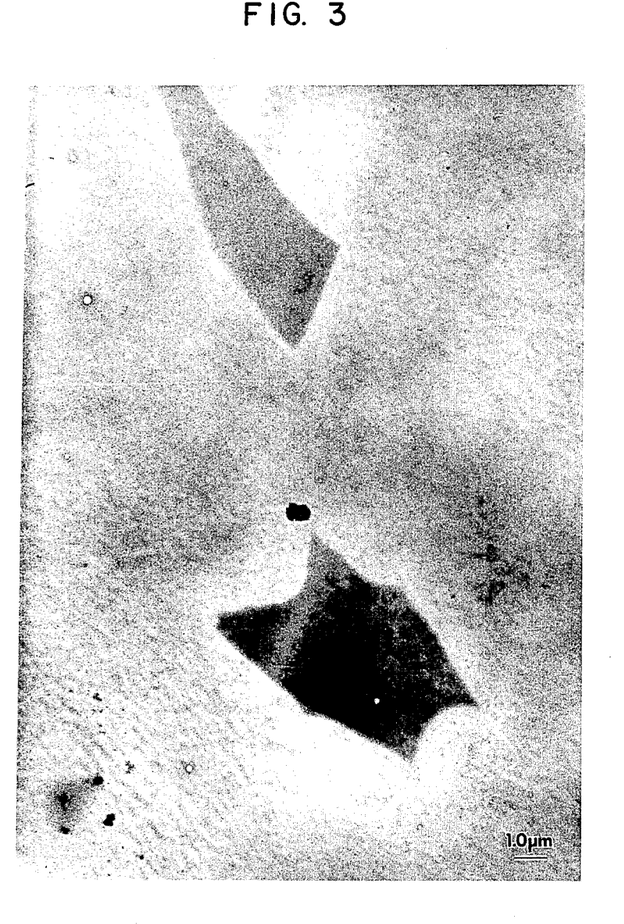
FIG. 3 is a photograph taken using the electron microscope to show the cross-sectional structure of a particle of a powdery amine compound prepared in Comparative Example 2.

Particles of this powdered amine compound were fixed enclosedly with the cured epoxy resin composition, the composition layers were cured at 25° C., the resulting particles were sliced, and the resulting cross sections were photographed by using a transmission type electron microscope. One of the photographs taken is shown in FIG. 3. It can be seen therefrom that no layer in shell form is formed.

Example 3

(Synthesis of master batch of hardener)

Master batch of hardener H-3 was obtained in the same manner as in Example 2, except that the water content of the powder amine compound X-1 was adjusted to 2.5% by moisture conditioning of the powder amine compound, instead of the addition of 5 g of water.

(Analysis of the master batch of hardener)

The master batch of hardener was analyzed by the same manner as in Example 2 to obtain the following results.

| | |
|---|---|
| Group (X) | 45 meq/kg |
| Group (Y) | 21 meq/kg |
| Group (Z) | 17 meq/kg |

(Preparation of composition)

To 100 g of an epoxy resin of Bisphenol AD (manufactured by Mitsui Petrochemical Industry Co., Ltd.) was added 25 g of the master batch of hardener. After previous rough kneading, the mixture was uniformly mixed by using three-roll mill and at an output rate of 110 g/min to prepare composition F-3.

(Measurement of physical properties of the composition F-3)

(1) The composition F-3 was kept to stand and change of the viscosity was measured. The initial viscosity of the composition F-3 was 110 poises at 25° C. and the viscosity thereof after one week standing at 50° C. was 180 poises at 25° C., so that no trouble in practical use could be observed in viscosity change.

(2) The gel time at 100° C. of the composition F-3 was measured by stroke cure method and found 620 seconds.

Comparative Example 3

(Synthesis of master batch of hardener)

Master batch of hardener H-4 was obtained in the same manner as in Example 2, except that the 5 g of water was not added.

(Analysis of the master batch of hardener)

The master batch of hardener was analyzed by the same manner as in Example 2. As a result, the groups (X) and (Y) were rarely detected.

(Preparation of composition)

(1) Composition F-4 was prepared in the same manner as in Example 2, except that the master batch of hardener H-4 was substituted for the master batch of hardener H-2 which was used in Example 2.

(2) Composition F-5 was prepared in the same manner as in preparation of Composition F-4, except that the mixing was conducted by using a spatula substituted for a three-roll mill.

(Measurement of physical properties of the compositions)

The compositions were allowed to stand and changes of the viscosities were measured. The initial viscosities at 25° C. of the compositions F-4 and F-5 were 190 poises and 210 poises, respectively, and as regard to the viscosities after one week standing at 50° C., the composition F-4 had a viscosity of over 2,000 poises and hardly flew, while the composition F-5 had a viscosity of 450 poises at 25° C., however, it was found that the storage stability thereof was deteriorated by mechanical shearing force by a three-rolle mill.

Examples 4 and 5

Master batches of hardeners H-5 and H-6 were synthesized in the same manner as in Synthesis of hardener in Example 2, except that the amount of water added was changed to 2.5 g and 10 g, respectively.

The obtained hardeners H-5 and H-6 were analysed to determine the concentrations of groups (X), (Y) and (Z). The results are shown in Table 1.

TABLE 1

| | | H-5 | H-6 |
|---|---|---|---|
| Group (X) | meq/kg of powder amine comp. | 10 | 270 |
| Group (Y) | meq/kg of powder amine comp. | 8 | 185 |
| Group (Z) | meq/kg of powder amine comp. | 6 | 25 |

Compositions F-6 and F-7 were prepared in the same manner as in Example 2, except that these master batches of hardeners H-5 and H-6 were used, respectively.

By using these compositions, viscosity change after a week standing at 50° C., gel time at 100° C., and iron-iron tensile shear strength were measured. The results are shown in Table 2.

TABLE 2

| | | F-6 | F-7 |
|---|---|---|---|
| Viscosity of composition (25° C./poises) | Initial | 170 | 175 |
| | 50° C./after a week | 320 | 180 |
| Gel time at 100° C. (sec) | | 510 | 620 |
| Tensile shear strength (Kg/cm$^2$) | | 135 | 127 |

Example 6

Master batch of hardener H-7 was obtained in the same manner as in Synthesis of hardener in Example 2, except that the amount of TDI added was changed to 8 g.

The obtained hardener H-7 was analysed to determine the concentrations of groups (X), (Y) and (Z). The result is shown in Table 3.

TABLE 3

| | | H-7 |
|---|---|---|
| Group (X) | meq/kg of powder amine comp. | 32 |
| Group (Y) | meq/kg of powder amine comp. | 13 |
| Group (Z) | meq/kg of powder amine comp. | 8 |

Examples 7 and 8

Master batches of hardeners H-8 and H-9 were obtained in the same manner as in the preparation of hardener of Example 2 except that the amount of the AER-331 used was changed to 200 g and 800 g, respectively.

Compositions F-8 and F-9 were prepared by using the master batches of hardeners H-8 and H-9 obtained in the formulations shown in Table 4, respectively.

By using these compositions, viscosity change after a week standing at 50° C. and gel time at 100° C. were measured. The results are shown in Table 4.

TABLE 4

| | | F-8 | F-9 |
|---|---|---|---|
| Formulation (g) | AER-331 | 110 | 85 |
| | Master batch of hardener H-8 | 16 | — |
| | Master batch of hardener H-9 | — | 40 |
| Viscosity of composition (25° C./poises) | Initial | 190 | 185 |
| | 50° C./after a week | 210 | 215 |

TABLE 4-continued

|  | F-8 | F-9 |
|---|---|---|
| Gel time at 100° C. (sec) | 550 | 570 |

Example 9

Master batch of hardener H-10 was obtained in the same manner as in Example 2, except that MR-2000 (polymethylene polyphenylene polyisocyanate; manufactured by Nippon Polyurethane Co., Ltd.) was substituted for the TDI.

The obtained hardeners H-10 was analysed in the same manner as in Example 2. The amount of xylene insolubles was 6.0 g. The groups (X), (Y) and (Z) were analysed. The result is shown in Table 5.

TABLE 5

|  |  | H-10 |
|---|---|---|
| Group (X) | meq/kg of powder amine comp. | 250 |
| Group (Y) | meq/kg of powder amine comp. | 166 |
| Group (Z) | meq/kg of powder amine comp. | 56 |

Examples 10 and 11

Master batches of hardeners H-11 and H-12 were obtained in the same manner as in Example 2, except that the powder amine compound X-1 was replaced by powder amine compounds X-2 and X-3, respectively.

Compositions F-10 and F-11 were prepared by using the resulting hardeners H-11 and H-12, respectively.

By using these compositions, viscosity change after a week standing at 50° C., gel time at 120° C. and glass transition temperature Tg of the cured products thereof were measured. The results are shown in Table 6.

TABLE 6

|  |  | F-10 | F-11 |
|---|---|---|---|
| Viscosity of composition (25° C./poises) | Viscosity after a week at 50° C. Initial viscosity | 1.2 | 1.8 |
| Gel time at 120° C. (sec) |  | 170 | 220 |
| Tg (°C.)* |  | 120 | 135 |

*Cured at 120° C. for 30 minutes.

Example 12

To 100 g of previously ground dicyandiamide having an average particle diameter of 3 μm was added 200 g of AER-331 and dispersed uniformly therein. To 150 g each of the resulting dispersion of dicyandiamide in epoxy resin was added the master batch of hardener H-2 which was obtained in Example 2 in amounts of 50 g and 150 g to obtain new master batches of hardeners H-13 and H-14, respectively.

Compositions F-12 and F-13 were obtained by adding 30 g of the master batches of hardeners H-13 and H-14, respectively, to a mixture of 95 g of AER-331 and 5 g of EP-4023 (CTBN-modified epoxy resin; manufactured by Adeka Co., Ltd.) and further adding thereto 20 g of calcium carbonate and mixing them uniformly.

Table 7 shows the viscosity change at 50° C., gel time at 140° C., and iron-iron tensile shear strength of the compositions.

TABLE 7

|  | F-12 | F-13 |
|---|---|---|
| Viscosity change of the composition | 1.3 | 1.5 |
| Gel time at 140° C. (sec) | 90 | 65 |
| Tensile shear strength (kg/cm$^2$) | 185 | 165 |

Example 13

Master batch of hardener H-15 was obtained by mixing 10 g of the master batch of hardener H-2 obtained in Example 2 and 90 g of methylhexahydrophthalic anhydride.

Composition F-14 was obtained by mixing 100 g of Epicron 830 (Bisphenol F type epoxy resin; manufactured by Dainippon Ink and Chemicals.

Viscosity change of the composition F-14 after a week standing at 50° C. was 2.5 times. The heat deformation temperature of the cured product obtained by curing the composition F-14 under the conditions of first at 100° C. for 3 hours and then at 150° C. for 3 hours was 135° C.

What is claimed is:

1. A master batch of hardener for curable one-package epoxy resin system which comprises
    (I) a hardener consisting of
        (i) a powder of an amine compound (A) as a core having at least one tertiary amino group in the molecule while having no primary and secondary amino groups, the powder having both a urea group capable of absorbing infrared rays of 1630 to 1680 cm$^{-1}$ in wave length and a biuret group capable of absorbing infrared rays of 1680 to 1725 cm$^{-1}$ in wave length at least on the surface of the powder, and
        (ii) a reaction product of the amine compound (A) and an epoxy resin as a shell; and
    (II) an epoxy resin (B) in a ratio of 10 to 50,000 parts by weight to 100 parts by weight of the hardener (I).

2. A master batch of hardener as recited in claim 1, wherein the amine compound (A) is a reaction product of a tertiary-amino-containing amino compound with an isocyanate compound in the presence of an epoxy resin and water.

3. A master batch of hardener as recited in claim 2, wherein the tertiary-amino-containing amino compound is a compound having at least one hydroxyl group in the molecule.

4. A master batch of hardener as recited in claim 3, wherein the tertiary-amino-containing amino compound is a reaction product of a primary or secondary amine with an epoxy-containing compound.

5. A master batch of hardener as recited in claim 4, wherein the secondary amine is an imidazole compound or N-methylpiperazine.

6. A master batch of hardener as recited in claim 4, wherein the epoxy-containing compound is synthesized by reacting a polyphenol compound with epichlorohydrin.

7. A master batch of hardener as recited in claim 2, wherein the tertiary-amino-containing amino compound is a reaction product of an imidazole compound with a bisphenol A type epoxy resin.

8. A master batch of hardener as recited in claim 2, wherein the tertiary-amino-containing amino compound is a reaction product of an imidazole compound with a mono epoxy compound.

9. A master batch of hardener as recited in claim 2, wherein the isocyanate compound is at least one selected from the group of tolylenediisocyanate, methylenediphenyldiisocyanate and polymethylene polyphenylpolyisocyanate.

10. A master batch of hardener as recited in claim 1, wherein the concentration of the urea group in said amine compound (A) is 1 to 1000 meg/kg.

11. A master batch of hardener as recited in claim 1, wherein the concentration of the biuret group in said amine compound (A) is 1 to 1000 meg/kg.

12. A master batch of hardener as recited in claim 1, wherein said amine compound (A) has further a urethane group capable of absorbing infrared rays of 1730 to 1755 cm$^{-1}$ in wave length.

13. A master batch of hardener as recited in claim 12, wherein the concentration of the urea group, the biuret group and the urethane group are 1 to 1000 meg/kg, 1 to 1000 meg/kg and 1 to 200 meg/kg, respectively.

14. A master batch of hardener as recited in claim 1, wherein the epoxy resin forming the shell is a condensate product of a polyphenol and epichlorohydrin.

15. A master batch of hardener as recited in claim 14, wherein the epoxy resin forming the shell is a bisphenol A type epoxy resin.

16. A master batch of hardener as recited in claim 1, wherein the shell is a product obtained by reacting 90 to 20 parts by weight of the amino compound (A) with 10 to 80 parts by weight of the epoxy resin.

17. A master batch of hardener as recited in claim 1, wherein the ratio between the core and the shell is from 100/0.1 to 100/50 by weight.

18. A master batch of hardener as recited in claim 1, wherein the epoxy resin (B) is a condensate of a polyphenol and epichlorohydrin.

19. A master batch of hardener as recited in claim 18, wherein the epoxy resin (B) is a bisphenol A type epoxy resin.

20. A master batch of hardener as recited in claim 1, wherein the ratio between the hardener (I) and the epoxy resin (II) is from 100/100 to 100/500.

21. A hardener for curable one package epoxy resin systems which comprises
 (I) a hardener consisting of
  (i) A powder of an amine compound (A) as a core having at least one tertiary amino group in the molecule while having no primary and secondary amino groups, the powder having both a urea group capable of absorbing infrared rays of 1630 to 1680 cm$^{-1}$ in wave length and a biuret group capable of absorbing infrared rays of 1680 to 1725 cm$^{-1}$ in wave length at least on the surface of the powder, and
  (ii) a reaction product of the amine compound (A) and an epoxy resin as a shell; and
 (II) an epoxy resin (B) in a ratio of 10 to 50,000 parts by weight to 100,
 (III) one or more of the compound (C) selected from the group consisting of a guanidine compound, an aromatic amine compound, a carboxylic anhydride, and a hydrazide, wherein the weight proportions of the hardener (I) and the compound (C) satisfy the equation $$0.02 \leq \text{Compound (C)/Hardener (I)} \leq 1000.$$

22. A hardener as recited in claim 21, wherein the compound (C) is dicyandiamide, and the weight proportions of the hardener (I) and the compound (C) satisfy the equation $$0.02 \leq \text{Dicyandiamide/Hardener (I)} \leq 50.$$

23. A hardener as recited in claim 21, wherein the compound (C) is selected from the group consisting of methylhexahydrophthalic anhydride, methyltetrahydrophthalic anhydride, methylnadic anhydride, and hexahydrophthalic anhydride and the weight proportions of the hardener (I) and compound (C) satisfy the equation $$1 \leq \text{Compound (C)/Hardener (I)} \leq 1000.$$

* * * * *

UNITED STATES PATENT AND TRADEMARK OFFICE
CERTIFICATE OF CORRECTION

PATENT NO. : 4,833,226
DATED : May 23, 1989
INVENTOR(S) : ISHIMURA et al

It is certified that error appears in the above-identified patent and that said Letters Patent is hereby corrected as shown below:

Column 7, line 50, "1000 meg/kg and 1 to 1000 meg/kg," should read --1000 meq/kg and 1 to 1000 meq/kg,--;

line 55, "1000 meg/kg," should read --1000 meq/kg,--;

line 59, "300 meg/kg." should read --300 meq/kg.--;

line 61, "meg/kg," should read --meq/kg,--;

line 64, "meg/kg," should read --meq/kg,--;

line 68, "200 meg/kg." should read --200 meq/kg.--.

Column 8, line 62, "100 meg/kg." should read --100 meq/kg.--.

Column 15, lines 56 and 57, "25 meg/kg and 15 meg/kg," should read --25 meq/kg and 15 meq/kg,--.

Column 21, line 8, "1000 meg/kg." should read --1000 meq/kg.--;

line 11, "1000 meg/kg." should read --1000 meq/kg.--;

line 19, "1000 meg/kg and 1 to 200 meg/kg," should read --1000 meq/kg and 1 to 200 meq/kg,--.

Signed and Sealed this

Twenty-first Day of August, 1990

Attest:

HARRY F. MANBECK, JR.

*Attesting Officer*   *Commissioner of Patents and Trademarks*